Feb. 3, 1959 A. W. MASSMAN ET AL 2,872,512
TELEVISION RECEIVER
Filed Oct. 19, 1953
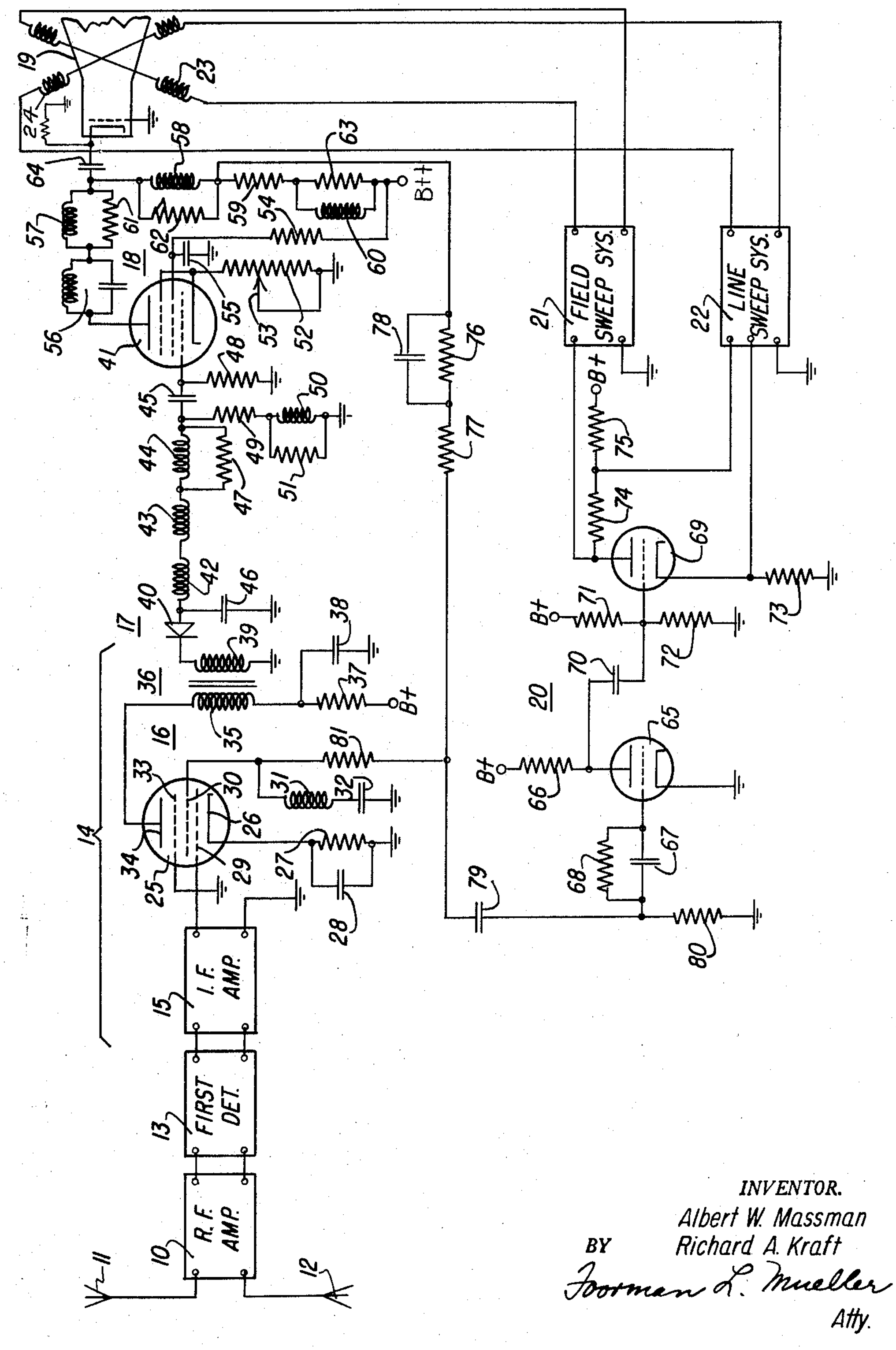
INVENTOR.
Albert W. Massman
Richard A. Kraft
BY
Foorman L. Mueller
Atty.

United States Patent Office 2,872,512

Patented Feb. 3, 1959

2,872,512

TELEVISION RECEIVER

Albert W. Massman, Wheaton, and Richard A. Kraft, Chicago, Ill., assignors to Motorola, Inc., Chicago, Ill., a corporation of Illinois Application October 19, 1953, Serial No. 386,891

2 Claims. (Cl. 178—7.3)

This invention relates generally to television receivers, and more particularly to a television receiver that is constructed in a new and improved fashion so that the synchronizing signal separator stage therein is not subject to paralysis by high level noise disturbances and the like that sometimes accompany the television signals utilized by the receiver.

This application is a continuation-in-part of copending application Serial No. 316,692, filed October 24, 1952, and now abandoned, in the name of the present inventors entitled "Television Receiver" and assigned to the present assignee.

The present-day television signal is standardized to include video frequency components occurring in a succession of line and field trace intervals interposed with line and field synchronizing components occurring during line and field retrace intervals, the synchronizing components being pedestaled on associated blanking components so as to extend into the blacker-than-black region beyond the maximum amplitude of the video frequency components. Present-day television receivers, accordingly, are each provided with a synchronizing signal separator stage which comprises an electron discharge device biased to clip the high amplitude synchronizing components from the television signal and translate only those components to the line and field sweep systems of the receiver for synchronizing purposes.

It is also usual practice to construct the input circuit of the synchronizing signal separator in such a manner that it responds to the peaks of the synchronizing components to render the above-mentioned discharge device self-biasing, at least to some extent, so that it will clip the synchronizing signal components at a fixed level within the television signal depsite slight variations in the intensity of the various television signals utilized by the receiver. Such synchronizing signal separators require a time-constant circuit including a series coupling capacitor, and difficulties have been encountered in the past in overcoming the adverse effects on the synchronizing process of the receiver of high amplitude noise bursts sometimes received concurrently with the television signals. The synchronizing components are supplied to the self-biasing input circuit of the synchronizing signal separator with positive polarity so that self-biasing due to grid leak action may be achieved. Any noise bursts also have positive polarity and such bursts with material energy content cause excessive grid current to flow and charge the coupling capacitor in the input circuit excessively. Subsequent discharge of this capacitor biases the synchronizing signal separator discharge device to a non-conductive state and paralyzes the separator for a time interval determined by the time constant of the input circuit of this device. This causes synchronization to be lost until the capacitor regains its normal charge condition since no synchronizing components are translated to the sweep systems of the receiver during the interval. Since the input circuit of the separator dischage device must have a certain minimum time constant in order that the proper self-biasing action may be maintained in response to the peaks of the synchronizing components, it is infeasible to reduce the time constant of the input circuit to a sufficiently low value to overcome the deleterious effects of the noise bursts referred to above.

It is accordingly, an object of the present invention to provide a television receiver that includes a self-biased amplitude clipper synchronizing signal separator stage, and which is constructed in a new and improved manner so that the adverse effect of noise disturbances on the clipping level of the separator is materially reduced.

A further object of the invention is to provide such a new and improved television receiver that includes an amplitude clipper synchronizing signal separator stage of the type having a self-biasing input circuit including a series coupling capacitor, which is constructed so that the amplitude and energy content of noise bursts applied to the coupling capacitor are so limited that such noise bursts have little or no effect on the reproduction qualities of the receiver.

A feature of the invention is the provision of a television receiver in which an amplifier stage possesses non-linear characteristics at signal amplitudes corresponding to the amplitudes of the noise bursts in a received television signal effectively to detect such bursts, and in which the detected bursts are used at least partially to cancel the noise bursts in the signal applied to the synchronizing signal separator of the receiver.

The above and other features of the invention which are believed to be new are set forth with particularity in the appended claims. The invention itself, however, together with further objects and advantages thereof may best be understood with reference to the following description when taken in conjunction with the accompanying drawing in which the single figure shows a television receiver constructed in accordance with the invention.

The receiver of the present invention is constructed to utilize a modulated wave signal that includes desired components and which may include undesired components of higher amplitude than the desired components. The receiver includes a network for translating the wave signal and which possesses non-linear characteristics for signal amplitudes corresponding to the undesired components of the wave signal effectively to detect such undesired components. A detector is coupled to the network for demodulating the modulated wave signal so as to produce a demodulated signal including the desired components and the undesired components of the wave signal. The receiver also includes apparatus for utilizing the desired components of the demodulated signal and circuit means for supplying the demodulated signal from the detector to such apparatus. A second circuit means is coupled to the network referred to above for deriving the detected undesired components of the wave signal from the network and for supplying the same to the former circuit means with a polarity to cancel at least partially the undesired components included in the demodulated signal.

The television receiver illustrated in the accompanying drawing includes a radio frequency amplifier 10 of any desired number of stages having input terminals connected to a suitable antenna 11, 12 and having output terminals coupled through a first detector 13 to an intermediate frequency amplifier 14. The intermediate frequency amplifier may have any number of stages connected and coupled together in well-known manner and indicated schematically by the block 15, and the amplifier also includes a final stage which is shown in circuit form and which is designated generally as 16. In a manner to be described, the final stage 16 of the intermediate frequency amplifier 14 has been selected to illustrate the present invention; but it is to be understood and it will be apparent as the description proceeds that any other stage in the intermediate frequency amplifier or elsewhere in the receiver that fulfills the requirements, may be so used.

Intermediate frequency amplifier 14 is coupled through a second detector indicated generally as 17 to a video amplifier indicated generally as 18, and the video amplifier is coupled to the input electrode of an image reproducing device 19 of the cathode ray type. Video amplifier 18 is also coupled to a synchronizing signal separator indicated generally as 20, the separator being connected to a field sweep system 21 and to a line sweep system 22. The output terminals of sweep systems 21 and 22 are connected respectively to the field deflecting elements 23 and line deflecting elements 24 of reproducing device 19.

The radio frequency amplifier 10, first detector 13 and the initial stages 15 of intermediate frequency amplifier 14 may be constructed and intercoupled in a manner well understood in the art, and for that reason these components of the receiver have been shown in block form since they in themselves form no part of the present invention. Likewise, field sweep system 21 and line sweep system 22 may both be constructed in any well-known manner so that a detailed description of these components is deemed to be unnecessary. Sweep system 22, for example, may be constructed in accordance with the teachings of Patent 2,645,717 which issued July 19, 1953, in the name of A. W. Massman and assigned to the present assignee.

Radio frequency amplifier 10 may be tuned to amplify a television signal intercepted by antenna 11, 12 and the amplified signal is heterodyned in first detector 13 to the selected intermediate frequency of the receiver. The resulting intermediate frequency signal is amplified in intermediate frequency amplifier 14 and detected in second detector 17 to produce a composite video signal, the latter being amplified in video amplifier 18 and applied to the input electrodes of reproducing device 19 to control the intensity of the cathode ray beam in the device in accordance with the image intelligence of the received television signal. The synchronizing components of the television signal are separated in separator 20 and applied to sweep systems 21 and 22 to synchronize the operation of these systems and therefore the deflection of the cathode ray beam in device 19 with the received television signal. In this manner, reproducing device 19 synthesizes an image corresponding to the televised scene. The sound portion of the television receiver forms no part of the present invention and, for that reason, has not been shown.

The final stage of intermediate frequency amplifier 14 comprises an electron discharge device 25 having a cathode 26 connected to a point of reference potential or ground through a cathode resistor 27, the resistor being shunted by a capacitor 28. Device 25 also has a control electrode 29 which is coupled to the preceding intermediate frequency amplifier stage in well-known manner. The screen electrode 30 of device 25 is by-passed to the reference potential point through a series-resonant network including an inductance coil 31 and a series-connected capacitor 32. Such a series resonant network is described and claimed in the copending application of Richard A. Kraft, filed April 28, 1953, under Serial No. 351,615. The suppressor electrode 33 of device 25 is connected to ground, and the anode 34 of the device is connected through the primary winding 35 of a coupling transformer 36 and through a resistor 37 to the positive terminal B+ of a source of unidirectional potential. The junction of winding 35 with resistor 37 is by-passed to ground through a capacitor 38.

The secondary winding 39 of transformer 36 has one end connected to ground and its other end is connected to one electrode of rectifying element 40 such as a diode or crystal. The circuit of element 40 constitutes the second detector 17 of the receiver, and the other electrode of the element is coupled to the control electrode of an electron discharge device 41 through a series of peaking coils 42, 43, 44 and through a coupling capacitor 45. The latter electrode of element 40 is by-passed to the reference potential point through a capacitor 46, coil 44 is shunted by a damping resistor 47, and the control electrode of device 41 is connected to the reference potential point through a grid-leak resistor 48. The junction of coil 44 and capacitor 45 is connected to the reference potential point through a load resistor 49 and a peaking coil 50, the latter being shunted by a damping resistor 51.

The circuit of discharge device 41 constitutes the video amplifier 18 of the receiver. The cathode of this device is connected to the suppressor electrode, and these elements are connected to the reference potential point through a resistor 52. Resistor 52 has a variable tap 53 thereon to constitute a well-known contrast control. The screen electrode of device 41 is connected to the positive terminal B++ of a source of unidirectional potential through a resistor 54, and this electrode is by-passed to ground through a capacitor 55. The anode of device 41 is connected to the positive terminal B++ through a parallel-resonant trap network 56, through a pair of peaking coils 57 and 58, and through a resistor 59 and a further peaking coil 60. Peaking coils 57, 58 and 60 are shunted respectively by damping resistors 61, 62 and 63. The junction of coils 57 and 58 is coupled to the input electrodes of reproducing device 19 through a coupling capacitor 64. The peaking coils referred to above provide the desired response to the video frequency components of the received television signal. Trap network 56 removes the 4.5 megacycle intercarrier sound signal from the input electrodes of reproducing device 19.

The synchronizing signal separator 20 of the receiver includes an electron discharge device 65. This device includes a cathode connected to the point of reference potential and an anode connected through a load resistor 66 to the positive terminal B+. The device also includes an input circuit comprising capacitor 67 shunted by a resistor 68 and connected to the control electrode of device 65. The anode of device 65 is coupled to the control electrode of an electron discharge device 69 through a coupling capacitor 70. The control electrode of device 69 is connected to the common junction of a pair of resistors 71 and 72, these resistors being connected between the positive terminal B+ and the point of reference potential to constitute a potentiometer. The cathode of device 69 is connected to the point of reference potential through a cathode resistor 73 and the anode of this device is connected to the positive terminal B+ through a pair of series-connected resistors 74 and 75. The anode of device 69 is coupled to field sweep system 21, and the cathode of this device together with the common junction of resistors 74 and 75 are coupled to line sweep system 22. Device 69 functions in well-known manner as an additional clipper in separator 20 and, when the line sweep system of the Massman patent referred to previously herein is used, this device also functions as a phase splitter for the purposes explained in that patent.

The first circuit means couples video amplifier 18 to the input circuit of device 65, and this circuit means includes a pair of series resistors 76 and 77, resistor 76 being shunted by a capacitor 78. The input circuit of device 65 also includes a capacitor 79 coupled between resistor 77 and capacitor 67, and a resistor 80 connecting the common junction of capacitors 67 and 79 to the point of reference potential.

The receiver is constructed to utilize a television signal which, in accordance with present-day standards, includes video frequency components, synchronizing components having a peak amplitude greater than the video components and which may also include undesired components in the form of noise bursts having an amplitude extending beyond the peak amplitude of the synchronizing components. When such a signal is received by the receiver it is amplified by video amplifier 14 and applied to second detector 17. Element 40 is connected in the second detector with a selected polarity so that the resulting composite video signal appearing across load resistor 49 and peaking coil 50 has its video frequency components, synchronizing components and associated undesired noise components extending in a negative going direction. The composite video signal is amplified by device 41 in video amplifier 18, and the signal appears across the output circuit 56—63 of this device in amplified form and with inverted phase. That is, the amplified composite video signal in the output circuit of device 41 has video and synchronizing components extending in a positive going direction, and may also include undesired noise components also extending in a positive going direction and having peak amplitudes exceeding that of the synchronizing components. The composite video signal is applied to the input electrodes of reproducing device 19 through coupling capacitor 64 in known manner, and the signal is also applied to the control electrode of device 65 in separator 20 through the first circuit means 76—78 and through the input circuit 67, 68, 79, 80 of device 65.

Device 41, in addition to functioning as a video amplifier, also acts as a noise clipper to some extent so that the positive going noise bursts in the composite video signal in the output circuit of this device have limited amplitude. However, it has been found that noise bursts still have sufficient amplitude and energy content to affect adversely the synchronizing process of the receiver unless some compensating means is provided. The input circuit 79, 80 and 67, 68 of device 65 is of the known double time-constant self-biasing type. This input circuit biases device 65 so that it clips the synchronizing components from the composite video signal in the video amplifier output circuit since only these components have sufficient amplitude to overcome the bias of the device to be translated thereby to device 69. Moreover, the input circuit 67, 68 and 79, 80 of device 65 responds to the positive peaks of the synchronizing components to vary the bias of device 65 for differing intensities of the composite video signal so that separator 20 will always clip at a selected level within the composite video signal even though the intensity of the signal may vary between certain limits.

Without compensation, the positive going noise bursts appearing in the output circuit of video amplifier discharge device 41 cause grid current flow in device 65 so that capacitors 79 and 67 become excessively charged, and the subsequent discharge of these capacitors through their time-constant resistors 80 and 68 bias device 65 in a negative direction to cut off. The separator, therefore, is paralyzed and no longer translates the synchronizing components to the sweep systems 21 and 22. Synchronization is lost, therefore, until the charges of these capacitors regain their operating value. The expedient of using the disclosed double time-constant input circuit is well known, and such input circuit corrects this tendency to some extent by providing a low time-constant network and a high time-constant network in the input circuit. However, this arrangement has been found to be not completely satisfactory and the separator is still subject to paralysis under certain noise conditions.

Discharge device 25 in the intermediate frequency amplifier is constructed and connected to possess non-linear characteristics for signal amplitudes corresponding to the undesired noise bursts, that is, to signal amplitudes exceeding that of the synchronizing components. This device, therefore, effectively detects the high amplitude noise bursts and such bursts appear on the screen electrode 30 across resonant circuit 31, 32 with negative going polarity. In other words, the series resonant network 31, 32 which is tuned to the intermediate frequency signal by-passes this signal to the point of reference potential so that the video and synchronizing components of the received television signal which are not detected in device 25 do not appear across this network. However, due to the detection of the noise components they alone appear across the network and with negative-going polarity. A second circuit means including a resistor 81 is provided which connects the screen electrode 30 of device 25 to the first circuit means between resistor 77 and capacitor 79, and which supplies these detected noise components to the first circuit means.

The detected noise components from the screen of device 25, as previously noted, have negative going polarity so that they cancel at least to some extent the positive going noise components in the first circuit means derived from the video amplifier so as to obviate the adverse effects of such positive going noise components on separator 20. The circuit can be adjusted so that complete cancellation of the positive going noise components is obtined, or even over compensation. The negative going noise components resulting from over compensation have little effect on the synchronizing process of the receiver since they merely drive the control electrode of device 65 in a negative direction and do not produce a charge on capacitors 79 and 67.

The use of the resonant circuit 31, 32 gives a sharp by-pass to the intermediate frequency yet does not affect the noise bursts over the relatively broad band in which they occur so that they are passed unattenuated to the first circuit means to perform their neutralizing function. Moreover, the use of the resonant circuit provides full by-pass to the intermediate frequency signal without adversely affecting the response of the video amplifier. It is to be understood, however, that although it has been found that superior results can be obtained by the use of series resonant circuit 31, 32, that a usual by-passing capacitor for the intermediate frequency may be substituted therefor, when so desired.

It is also to be noted that the limiting characteristics of device 25 in the intermediate frequency amplifier are increased by the disclosed circuit of the invention. This obtains since the screen electrode 30 of device 25 is not returned to B+ as in conventional receivers, but is excited by potential derived from the output circuit of the video amplifier. This direct current connection can be traced through elements 81, 77, 76, 59 and 60 to the positive terminal B++. The screen electrode is excited, therefore, by a potential that generally follows the envelope of video modulation. In this fashion, a sudden noise burst occurring, for example, during a period of average video modulation is limited to some extent in device 25 due to the reduced excitation of screen electrode 30 corresponding substantially to the average of the video modulation. It is also to be noted that a certain amount of gamma correction is obtained by the circuit of this invention since screen electrode 30 of device 25 is excited with maximum voltage when the video signal is in the black region resulting in increased amplification or expansion of the darker shade values which compensate for the reduced response of most present-day cathode ray reproducing devices thereto.

In a constructed embodiment of the invention highly satisfactory results were obtained by using the following parameters, and these parameters are given herein merely by way of illustration and are not intended as any limitation on the invention:

| | |
|---|---|
| B++ | 250 volts. |
| B+ | 150 volts. |
| Device **25** | 6CB6. |
| Capacitor **67** | 220 micromicrofarads. |
| Capacitor **79** | .005 microfarads. |
| Resistor **77** | 10K. |
| Resistor **76** | 15K. |
| Resistor **68** | 270K. |
| Capacitor **78** | 470 micromicrofarads. |
| Resistor **81** | 1K. |
| Resistor **37** | 1K. |
| Resistor **59** | 3.9K. |
| Coil **60** | 450 microhenries. |

The invention provides, therefore, an improved television receiver which is constructed to include an extremely simple and inexpensive compensating network that responds to the detection of the noise components of a received signal to compensate the adverse effects of such components on a utilization stage of the receiver.

While a particular embodiment of the invention has been shown and described, modifications may be made, and it is intended in the appended claims to cover all such modifications as fall within the true spirit and scope of the invention.

We claim:

1. In a receiver for utilizing a modulated television signal which includes video frequency components and synchronizing components, and which signal may include undesirable noise components having amplitudes exceeding the amplitudes of the video and synchronizing components, the combination of an intermediate frequency amplifier for translating the television signal, said amplifier including a first electron discharge device having a cathode, a control electrode, a screen electrode and an anode, means for applying the television signal at an intermediate frequency to said cathode and control electrodes, said amplifier including means providing nonlinear response of said first electron discharge device for signal amplitudes of the undesired noise components, said amplifier further including impedance means coupled between said screen electrode and said cathode to provide detection of the noise components with negative polarity at said screen electrode, means including a detector circuit coupled to said anode to derive the video frequency components and synchronizing components together with the undesired noise components, video amplifier means coupled to said detector circuit for translating the aforementioned components, said video amplifier means including a second electron discharge device having an output element and a direct current energization circuit therefor in which the undesired noise components appear with positive polarity, a synchronizing signal separator circuit including a third electron discharge device having input electrodes, said synchronizing signal separator circuit including a series input capacitor and a fixed resistor connected between said input electrodes, means connecting said direct current energization circuit to said capacitor for applying the synchronizing components to said third electron discharge device with positive going polarity whereby said resistor and capacitor provide a self-biasing network for said third electron discharge device, and passive direct current means connecting said screen electrode of said first electron discharge device to said direct-current energization circuit for said second electron discharge device so that said screen electrode is energized therefrom, whereby the undesired noise components are cancelled in the signal components supplied to said synchronizing signal separator through said capacitor and only the video frequency components and synchronizing components are coupled to said third electron discharge device.

2. In a receiver for utilizing a modulated television signal which includes video frequency components and synchronizing components, and which signal may include undesirable noise components having amplitudes exceeding the amplitudes of the video and synchronizing components, the combination of an intermediate frequency amplifier for translating the television signal, said amplifier including a first electron discharge device having a cathode, a control electrode, a screen electrode and an anode, means for applying the television signal at an intermediate frequency to said cathode and control electrodes, said amplifier including means providing nonlinear response of said first electron discharge device for signal amplitudes of the undesired noise components, said amplifier further including a series tuned circuit resonant at the intermediate frequency and coupled between said screen electrode and said cathode to provide detection of the noise components with negative polarity at said screen electrode, means including a detector circuit coupled to said anode to derive the video frequency components and synchronizing components together with the undesired noise components, video amplifier means coupled to said detector circuit for translating the aforementioned components, said video amplifier means including a second electron discharge device having an output element and a direct current energization circuit therefor in which the undesired noise components appear with positive polarity, a synchronizing signal separator circuit including a third electron discharge device having input electrodes, said synchronizing signal separator circuit including a series input capacitor and a fixed resistor connected between said input electrodes, means connecting said direct current energization circuit to said capacitor for applying the synchronizing components to said third electron discharge device with positive going polarity whereby said resistor and capacitor provide a self-biasing network for said third electron discharge device, and passive circuit means connecting said screen electrode of said first electron discharge device to said direct-current energization circuit for said second electron discharge device whereby the undesired noise components are cancelled in the signal components supplied to said synchronizing signal separator through said capacitor so that only the video frequency components and synchronizing components are coupled to said third electron discharge device and said self-biasing network is not subjected to the undesired noise components.

References Cited in the file of this patent

UNITED STATES PATENTS

| | | |
|---|---|---|
| 2,631,230 | Marsh | Mar. 10, 1953 |
| 2,791,627 | Thomas et al. | May 7, 1957 |

FOREIGN PATENTS

| | | |
|---|---|---|
| 515,675 | Belgium | Dec. 15, 1952 |

OTHER REFERENCES

Rider's Television Manual, vol. 10, Magnavox TV, pages 10–19, copyrighted November 21, 1952.